(12) United States Patent
Choi

(10) Patent No.: US 11,900,326 B2
(45) Date of Patent: Feb. 13, 2024

(54) METHOD OF MANAGING STRATEGY-MAP EXECUTABLE BY COMPUTER, SERVER PERFORMING THE SAME AND STORAGE MEDIA STORING THE SAME

(71) Applicants: DELTA PDS CO., LTD, Seoul (KR); Jae Ho Choi, Seoul (KR)

(72) Inventor: Jae Ho Choi, Seoul (KR)

(73) Assignees: DELTA PDS CO., LTD, Seoul (KR); Jae Ho Choi, Seoul (KR)

( * ) Notice: Subject to any disclaimer, the term of this patent is extended or adjusted under 35 U.S.C. 154(b) by 0 days.

(21) Appl. No.: 17/874,878

(22) Filed: Jul. 27, 2022

(65) Prior Publication Data

US 2022/0358464 A1 Nov. 10, 2022

Related U.S. Application Data

(63) Continuation of application No. 15/276,319, filed on Sep. 26, 2016, now Pat. No. 11,449,834, which is a
(Continued)

(30) Foreign Application Priority Data

| Mar. 26, 2014 | (KR) | 10-2014-0035512 |
| Jun. 16, 2016 | (KR) | 10-2016-0075274 |
| Jul. 29, 2016 | (KR) | 10-2016-0097266 |

(51) Int. Cl.
*G06Q 10/10* (2023.01)
*H04L 51/046* (2022.01)
*G06Q 10/04* (2023.01)

(52) U.S. Cl.
CPC .......... *G06Q 10/103* (2013.01); *G06Q 10/04* (2013.01); *H04L 51/046* (2013.01)

(58) Field of Classification Search
CPC .......................... G06Q 10/103; G06Q 30/014
See application file for complete search history.

(56) References Cited

U.S. PATENT DOCUMENTS

| 8,639,552 B1 | 1/2014 | Chen et al. |
| 2002/0138590 A1 | 9/2002 | Beams et al. |
(Continued)

FOREIGN PATENT DOCUMENTS

| KR | 10-2002-0024930 A | 4/2002 |
| KR | 10-2003-0025423 A | 3/2003 |
(Continued)

OTHER PUBLICATIONS

Sami Vasistha, A Framework and Evaluation of Virtual Project Management Tools, 2008 , (Year: 2008).*
(Continued)

*Primary Examiner* — Maria C Santos-Diaz
(74) *Attorney, Agent, or Firm* — Paratus Law Group, PLLC

(57) ABSTRACT

An apparatus for managing a business strategy map includes: a strategy map memory unit configured to include a business strategy map region for a business strategy map including a business specification in which a relation between a business project and a business executant has been defined, a business contents region for business contents accessible through the business specification and written by the business executant, a business chat message region for at least one business chat message accessible through the business contents, and a business object link region for a business object link included in the business specification and used to access a business object which is the business chat message and in which a business provider and a business recipient have been defined, and a business processor configured to provide specific business contents
(Continued)

within the business contents region through a specific business specification.

9 Claims, 9 Drawing Sheets

Related U.S. Application Data continuation-in-part of application No. PCT/KR2015/003014, filed on Mar. 26, 2015.

(56) References Cited

U.S. PATENT DOCUMENTS

| | | |
|---|---|---|
| 2002/0156668 A1 | 10/2002 | Morrow et al. |
| 2003/0023686 A1 | 1/2003 | Beams et al. |
| 2003/0055660 A1 | 3/2003 | Gusler et al. |
| 2006/0259524 A1 | 11/2006 | Horton |
| 2008/0172625 A1 | 7/2008 | Montgomery |
| 2008/0209417 A1 | 8/2008 | Jakobson |
| 2010/0021870 A1 | 1/2010 | Patten et al. |
| 2010/0135598 A1 | 6/2010 | Olwen et al. |
| 2012/0110087 A1 | 5/2012 | Culver et al. |
| 2012/0159349 A1 | 6/2012 | Kansky |
| 2013/0024452 A1 | 1/2013 | Defusco et al. |
| 2013/0104098 A1 | 4/2013 | Bhogal et al. |
| 2013/0110565 A1 | 5/2013 | Means, Jr. et al. |
| 2013/0191291 A1 | 7/2013 | Greeson |
| 2013/0198304 A1* | 8/2013 | Jung .................. H04L 12/1818 709/206 |
| 2013/0238510 A1 | 9/2013 | Wieboldt |
| 2013/0297700 A1 | 11/2013 | Hayton et al. |
| 2013/0304763 A1 | 11/2013 | Esposito et al. |
| 2013/0318589 A1 | 11/2013 | Ford et al. |
| 2013/0335509 A1 | 12/2013 | Cafferata |
| 2014/0036656 A1 | 2/2014 | Chou et al. |
| 2014/0047560 A1 | 2/2014 | Meyer et al. |
| 2014/0358606 A1 | 12/2014 | Hull |
| 2015/0112749 A1* | 4/2015 | Erdal .................. G06Q 10/1095 715/752 |
| 2015/0269512 A1 | 9/2015 | Wartel |
| 2015/0324899 A1* | 11/2015 | Starikova ............... G06Q 40/00 705/35 |

FOREIGN PATENT DOCUMENTS

| | | |
|---|---|---|
| KR | 10-2007-0021858 A | 2/2007 |
| KR | 10-0743150 B1 | 7/2007 |
| KR | 10-2009-0001748 A | 1/2009 |
| KR | 10-2009-0048237 A | 5/2009 |
| KR | 10-2010-0026086 A | 3/2010 |
| KR | 10-2010-0063289 A | 6/2010 |
| KR | 10-2010-0081415 A | 7/2010 |
| KR | 10-2012-0007302 A | 1/2012 |
| KR | 10-2012-0082707 A | 7/2012 |
| KR | 10-1192336 B1 | 10/2012 |
| KR | 10-1437565 B1 | 9/2014 |
| KR | 10-2015-0053054 A | 5/2015 |
| KR | 10-2015-0111884 A | 10/2015 |
| KR | 10-2016-0038672 A | 4/2016 |

OTHER PUBLICATIONS

Owonikoko, E. A. (2016). Building and maintaining trust in virtual teams as a competitive strategy (Year: 2016).*
4. S. Negi, S. Joshi, A. K. Chalamalla and L. V. Subramaniam, "Automatically Extracting Dialog Models from Conversation Transcripts," 2009 Ninth IEEE International Conference on Data Mining, Miami Beach, FL, USA, 2009, pp. 890-895, doi: 10.1109/ICDM.2009.113. (Year: 2009).*
Korean Office Action for related KR application No. 10-2016-0075274 dated Jan. 25, 2017 from Korean Patent Office.
Korean Office Action for related KR application No. 10-2016-0097266 dated Feb. 27, 2018 from Korean Patent Office.
Seokho Chi et al., "Development of a data mining-based analysis framework for multi-attribute construction project information", Advanced Engineering Informatics, Apr. 13, 2012, pp. 574-581, vol. 26.

* cited by examiner

FIG. 6

Project: Carbon Wet-Laid

| | |
|---|---|
| Date of preparation | 2014-03-09 |
| Customer | Internal |
| Interviewer | No |
| Writing team name | |
| Writer | 2. Hyun-soo Byeon/Na-se Ha/Won-seok Gwag |
| Agreed contents | Investigation of a company, such as handling items, major business, and sales of members who have joined JPRS in order to find a market of carbon fiber sheets in Japan |
| Problematic contents | 50% of joined members were companies, and the remaining 50% were laboratories and university-related institutions. Information was obtained through the site of each company, but most of companies already handle similar types of articles |
| Solved contents | To make contact with which company is determined to be important because the range of products handled by joined members is not wide. |
| Future plan | Whether project will be performed in the future is to be determined depending on whether a contact with a company is present or not |
| Attached file | JPRS completed copy.docx |
| Date of preparation | March 9, 2015, 10:46 a.m. |
| ID | 303347 |
| Action index | 102 (input:0, interested: 0, shared: 102) |

| Business name | Dec. 2013 | | | | | | | | | | | | | | | Jan 2014 | | |
|---|---|---|---|---|---|---|---|---|---|---|---|---|---|---|---|---|---|---|
| | 10 | 11 | 12 | 13 | 16 | 17 | 18 | 19 | 20 | 23 | 24 | 25 | 26 | 27 | 30 | 31 | 1 | 2 | 3 |
| Proceedings | | | | | | | | | | | | | | | | | | | |
| AGM | | ■ | ■ | ■ | | | | | | | | | | | | | | | |
| Glass Pastiong Paper | | | | | ■ | ■ | ■ | ■ | | | ■ | | | | | | | | |
| Synthetic fiber pasing paper | | | | | | | ■ | | | | | | | | | | | | |
| Lithium ion battery | | | | | | | | ■ | | | | | | | | | | | |
| Carbon fiber | | | | | | | | | ■ | | | | | | | | | | |
| PET Sheet | | | | | | | | | ■ | | | | | | | | | | |
| Glass+A1 fiber | | | | | | | | | | | ■ | ■ | | ■ | ■ | ■ | ■ | ■ | |
| Insulation sheet for Styrofoam ejection | | | | | | | | | | | | | ■ | | | | | | |
| Filter for high temperature (Japanese company) | | | | | | ■ | ■ | ■ | | | | | | | | | ■ | ■ | |

METHOD OF MANAGING STRATEGY-MAP EXECUTABLE BY COMPUTER, SERVER PERFORMING THE SAME AND STORAGE MEDIA STORING THE SAME

CROSS-REFERENCE TO PRIOR APPLICATIONS

This application is a Continuation application of U.S. patent application Ser. No. 15/276,319 (filed on Sep. 26, 2016), which is a Continuation-In-part application of PCT International Patent Application No. PCT/KR2015/003014 (filed on Mar. 26, 2015), which claims priority to Korean Patent Application Nos. 10-2014-0035512 (filed on Mar. 26, 2014), 10-2016-0075274 (filed on Jun. 16, 2016), and 10-2016-0097266 (filed on Jul. 29, 2016), which are all hereby incorporated by reference in their entirety.

BACKGROUND

The present invention relates to a business strategy map management technology and, more particularly, to an apparatus for managing a business strategy map for providing internal customer satisfaction, which is capable of efficiently managing a business project performed by a business execution organization.

The project management process of a company is chiefly developed and constructed by an expert based on a related industry and business process so that it is optimized for the corresponding company. A conventional project management process has many limits in efficiently managing a business project and project schedule performed by a plurality of business execution organizations.

Korean Patent Application Publication No. 10-2007-0021858 (Feb. 23, 2007) relates to a system for managing business schedule based on an electrical communication network. The system can improve efficiency of a company business progress and can improve business efficiency by assigning a mileage according to the generation of a business instruction according to MBO and a report thereof and according to the characteristics of business when the corresponding business is performed.

Korean Patent Application Publication No. 10-2009-0001748 (Jan. 9, 2009) relates to a system and method for supplying a messenger service for an enterprise and, more particularly, to a system and method for supplying a messenger service for an enterprise, wherein information about a company infrastructure service can be checked on a messenger for an enterprise, a link to the company infrastructure service is provided, and communication with a messenger user for another enterprise is also made possible.

Korean Patent Application Publication No. 10-2010-0026086 (Mar. 10, 2010) relates to a work instruction system and method. The work instruction system for instructing the person in charge on an operating work includes a person-in-charge terminal configured to display an operating work and a work instruction server configured to include a database in which the entire work information about all of operating works to be performed for a period of two or more days has been stored, to generate daily work information including a corresponding relation between an operating work to be performed today and the person-in-charge terminal on which each operating work is to be instructed based on the entire work information stored in the database, and to transmit the daily work information to the person-in-charge terminal. Accordingly, an operating work can be stably performed.

PRIOR ART DOCUMENT

[Patent Document]
1. Korean Patent Application Publication No. 10-2007-0021858 (Feb. 23, 2007)
2. Korean Patent Application Publication No. 10-2009-0001748 (Jan. 9, 2009)
3. Korean Patent Application Publication No. 10-2010-0026086 (Mar. 10, 2010)

SUMMARY OF THE INVENTION

An embodiment of the present invention is directed to the provision of an apparatus for managing a business strategy map for providing internal customer satisfaction, which is capable of efficiently managing and evaluating a business project performed by a business execution organization.

An embodiment of the present invention is directed to the provision of an apparatus for managing a business strategy map for providing internal customer satisfaction, which supports a business project so that efficient information processing can be performed on the business project based on a business specification.

In embodiments, an apparatus for managing a business strategy map for providing internal customer satisfaction includes a strategy map memory unit configured to include a business strategy map region for a business strategy map including a business specification in which a relation between a business project and a business executant has been defined, a business contents region for business contents accessible through the business specification and written by the business executant, a business chat message region for at least one business chat message accessible through the business contents, and a business object link region for a business object link included in the business specification and used to access a business object which is the business chat message and in which a business provider and a business recipient have been defined, and a business processor configured to provide specific business contents within the business contents region through a specific business specification or to provide a specific business object through a business object link within the business object link region.

The business processor may provide a business chat message within a business chat room associated with the specific business contents.

The business processor may identify the business object link in the at least one business chat message in the process of providing the business chat message and additionally provide a business message within a corresponding business object.

The business processor may receive a request to delete the corresponding business object from a terminal of the business provider and change the corresponding business object into a corresponding business chat message based on the business message.

The business processor may receive the business recipient in response to a request from a user terminal and set a specific business chat message as the business object.

The business processor may generate a corresponding business object in which a corresponding business message has been set as the specific business chat message in a business object region of the strategy map memory unit.

The business processor may generate a corresponding business object link for accessing the corresponding business object through the business specification or the specific business chat message.

The business processor may receive a business message and a business deadline in addition to the business recipient from a user terminal and generate the business object in a business object region of the strategy map memory unit.

The business processor may receive a business log which is capable of including a specific problem relating to a given business and generate corresponding business contents in the business contents region.

The business processor may provide the specific problem a person in charge of the given business and query whether or not to open a business chat room.

The strategy map memory unit may further include a business object region for the business object. The business object may include a business message and business deadline written by the business provider and a business state indicative of a business processing stage of the business recipient in addition to the business provider and the business recipient.

The business processor may detect that a business processing stage of the business state has been set as a completion stage if the business object includes a business evaluation, and may request a business evaluation from the business provider.

In embodiments, a method for managing a business strategy map which is performed by an apparatus for managing a business strategy map, including a business processor and a strategy map memory unit including a business strategy map region including a business contents region, a business chat message region, and a business object link region, includes the steps of (a) providing a business strategy map including a business specification in which a relation between a business project and a business executant has been defined through the business strategy map region, (b) providing business contents accessible through the business specification and written by the business executant through the business contents region, (c) providing at least one business chat message accessible through the business contents through the business chat message region, (d) providing a business object link included in the business specification and used to access a business object which is the business chat message and in which a business provider and a business recipient have been defined, and (e) providing specific business contents within the business contents region through a specific business specification or providing a specific business object through a business object link within the business object link region.

The step (e) may include providing a business chat message within a business chat room associated with the specific business contents.

The step (e) may include identifying the business object link in the at least one business chat message in a process of providing the business chat message and additionally providing a business message within a corresponding business object.

The step (e) may include receiving a request to delete the corresponding business object from a terminal of the business provider and changing the corresponding business object into a corresponding business chat message based on the business message.

The step (e) may include receiving the business recipient in response to a request from a user terminal and setting a specific business chat message as the business object.

The step (e) may include generating a corresponding business object in which a corresponding business message has been set as the specific business chat message in a business object region of the strategy map memory unit.

The step (e) may include generating a corresponding business object link for accessing the corresponding business object through the business specification or the specific business chat message.

In embodiments, there is provided a recording medium on which a method for managing a business strategy map which is performed by an apparatus for managing a business strategy map, including a business processor and a strategy map memory unit including a business strategy map region including a business contents region, a business chat message region, and a business object link region, has been recorded. The method includes the steps of (a) providing a business strategy map including a business specification in which a relation between a business project and a business executant has been defined through the business strategy map region, (b) providing business contents accessible through the business specification and written by the business executant through the business contents region, (c) providing at least one business chat message accessible through the business contents through the business chat message region, (d) providing a business object link included in the business specification and used to access a business object which is the business chat message and in which a business provider and a business recipient have been defined, and (e) providing specific business contents within the business contents region through a specific business specification or providing a specific business object through a business object link within the business object link region.

BRIEF DESCRIPTION OF THE DRAWINGS

FIG. 6 is a diagram showing the state in which the apparatus for managing a business strategy map shown in FIG. 1 displays a business log.

FIG. 8 is a diagram showing the state in which the apparatus for managing a business strategy map shown in FIG. 1 displays a project execution calendar.

FIG. 9 is a diagram showing the state in which the apparatus for managing a business strategy map shown in FIG. 1 displays a project schedule.

DETAILED DESCRIPTION OF THE EMBODIMENTS

Figure 1:
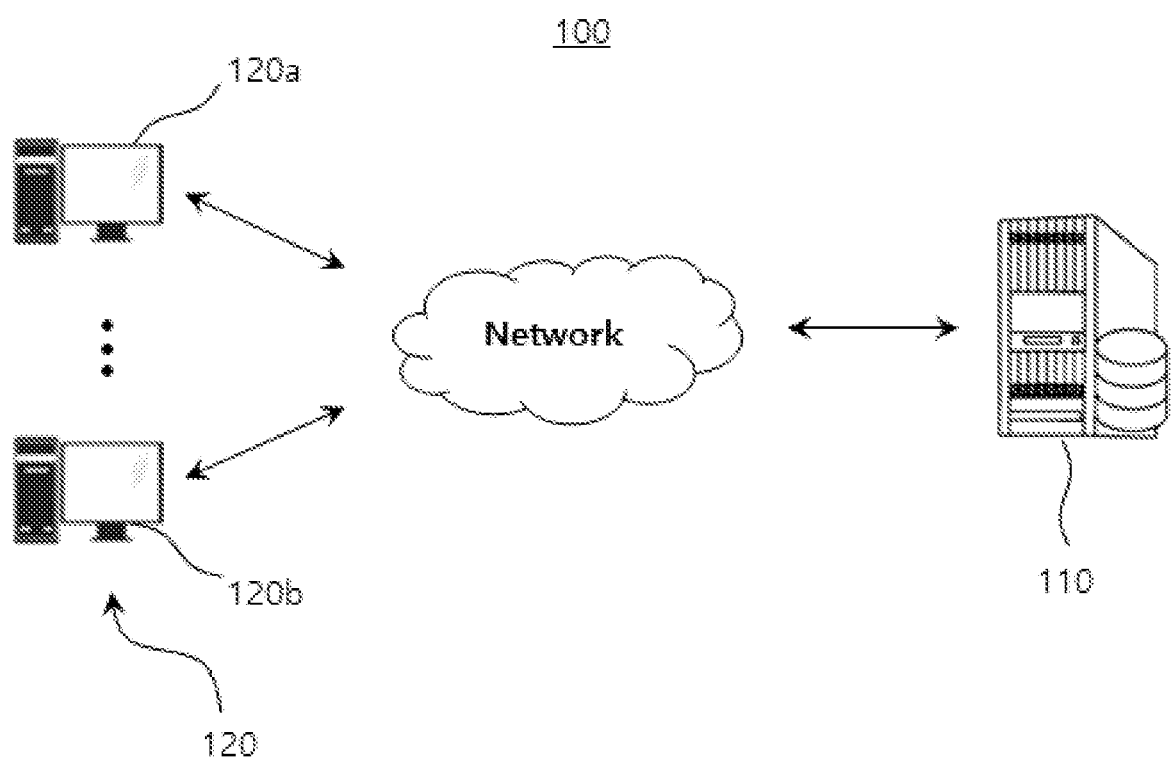
FIG. 1 is a diagram illustrating a system for managing a business strategy map for providing internal customer satisfaction according to an embodiment of the present invention.

A description of the present invention is merely an embodiment for a structural and/or functional description. The scope of the present invention should not be construed as being limited to embodiments described in the context. That is, the embodiments may be modified in various forms, and the scope of the present invention should be construed as including equivalents which may realize the technical spirit. Furthermore, an object or effect proposed in the present invention does not mean that a specific embodiment should include all of objects or effects or should include a corresponding effect, and thus the scope of the present invention should not be understood to be restricted thereby.

The meaning of terms described in this application should be construed as follows.

The terms, such as the "first" and the "second", are used to distinguish one element from the other element, and the scope of the present invention should not be restricted by the terms. For example, a first element may be named a second element. Likewise, a second element may be named a first element.

When it is said that one element is described as being "connected" to the other element, the one element may be directly connected to the other element, but it should be understood that a third element may be interposed between the two elements. In contrast, when it is described that one element is described as being "directly connected" to the other element, it should be understood that a third element is not interposed between the two elements. Meanwhile, the same principle applies to other expressions, such as "between ~" and "just between ~" or "adjacent to ~" and "adjacent just to ~", which describe a relation between elements.

An expression of the singular number should be understood to include plural expressions, unless clearly expressed otherwise in the context. The terms, such as "include" or "have", should be understood to indicate the existence of a set characteristic, number, step, operation, element, part, or a combination of them and not to exclude the existence of one or more other characteristics, numbers, steps, operations, elements, parts, or a combination of them or a possibility of the addition of them.

In each of steps, symbols (e.g., a, b, and c) are used for convenience of description, and the symbols do not describe order of the steps. The steps may be performed in order different from order described in the context unless specific order is clearly described in the context. That is, the steps may be performed according to described order, may be performed substantially at the same time, or may be performed in reverse order.

All the terms used herein, including technical or scientific terms, have the same meanings as those that are typically understood by those skilled in the art, unless otherwise defined. Terms, such as ones defined in common dictionaries, should be construed as having the same meanings as those in the context of related technology and should not be construed as having ideal or excessively formal meanings, unless clearly defined in the specification.

FIG. 1 is a diagram illustrating a system for managing a business strategy map for providing internal customer satisfaction according to an embodiment of the present invention.

Referring to FIG. 1, the system 100 for managing a business strategy map includes an apparatus 110 for managing a business strategy map for providing internal customer satisfaction and a business strategy map user terminal 120, which may be connected over a network.

The apparatus 110 for managing a business strategy map for providing internal customer satisfaction (hereinafter referred to as "the apparatus for managing a business strategy map") may be remotely connected to the at least one business strategy map user terminal 120. The apparatus 110 for managing a business strategy map may be connected to the at least one business strategy map user terminal 120 and may perform the management of a business strategy map. In particular, the apparatus 110 for managing a business strategy map may use a plurality of memory regions 213 and 216 so as to efficiently manage the business strategy map.

The business strategy map user terminal 120 may correspond to a computing device for performing a business process of a company through the business strategy map. For example, the business strategy map user terminal 120 may be implemented using a desktop, a notebook, a tablet PC or a smart phone.

Figure 2:
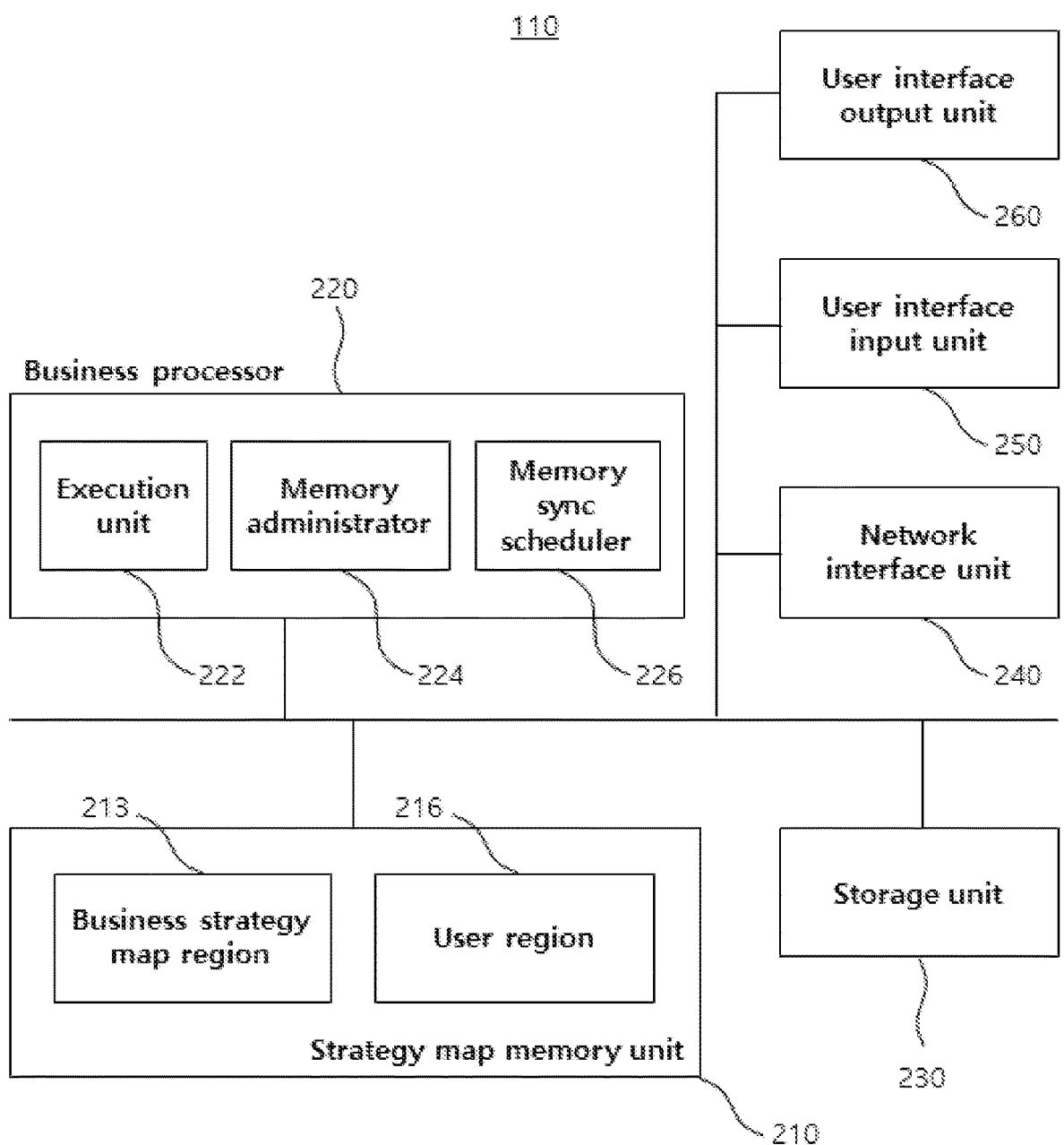
FIG. 2 is a block diagram illustrating an apparatus for managing a business strategy map for providing internal customer satisfaction (hereinafter referred to as an "apparatus for managing a business strategy map") shown in FIG. 1.

FIG. 2 is a block diagram illustrating the apparatus for managing a business strategy map shown in FIG. 1.

Referring to FIG. 2, the apparatus 110 for managing a business strategy map may include a strategy map memory unit 210, a business processor 220, a storage unit 230, a network interface unit 240, a user interface input unit 250, and a user interface output unit 260.

The strategy map memory unit 210 includes the business strategy map region 213 and the user region 216. The memory regions 213 and 216 may be implemented using volatile or non-volatile memory. If the memory regions 213 and 216 are implemented using non-volatile memory, they may be implemented so that they are connected through a hyperlink.

The business processor 220 may include a business strategy map execution unit 222, a memory administrator 224, and a memory sync scheduler 226. The business strategy map execution unit 222 may execute a business strategy map management procedure of FIG. 4, and may provide the business strategy map user terminal 120 with a variety of types of information fetched from the memory regions 213 and 216 during an execution process. The memory administrator 224 may manage the memory regions 213 and 216 of the strategy map memory unit 210, which are read or written by the business strategy map execution unit 222, and may synchronize the plurality of memory regions 213 and 216 with the storage unit 230. The memory sync scheduler 226 may schedule the synchronization time between the plurality of memory regions 213 and 216 and the storage unit 230.

The storage unit 230 may be implemented using non-volatile memory, such as a solid state disk (SSD) or a hard disk drive (HDD), and is used to store data for the apparatus 110 for managing a business strategy map. For example, the storage unit 230 implemented using non-volatile memory may be implemented through a database.

The network interface unit 240 may include an environment for a connection to the business strategy map user terminal 120 over a network, and may include an adapter for local area network (LAN) communication, for example.

The user interface input unit 250 may include an environment for receiving user input and may include an adapter, such as a mouse, a track ball, a touch pad, a graphic tablet, a scanner, a touch screen, a keyboard or a pointing device. The user interface output unit 260 may include an environment for outputting specific information (e.g., a business strategy map generated based on a business specification 310) to a user, and may include an adapter, such as a monitor or a touch screen.

Figure 3:
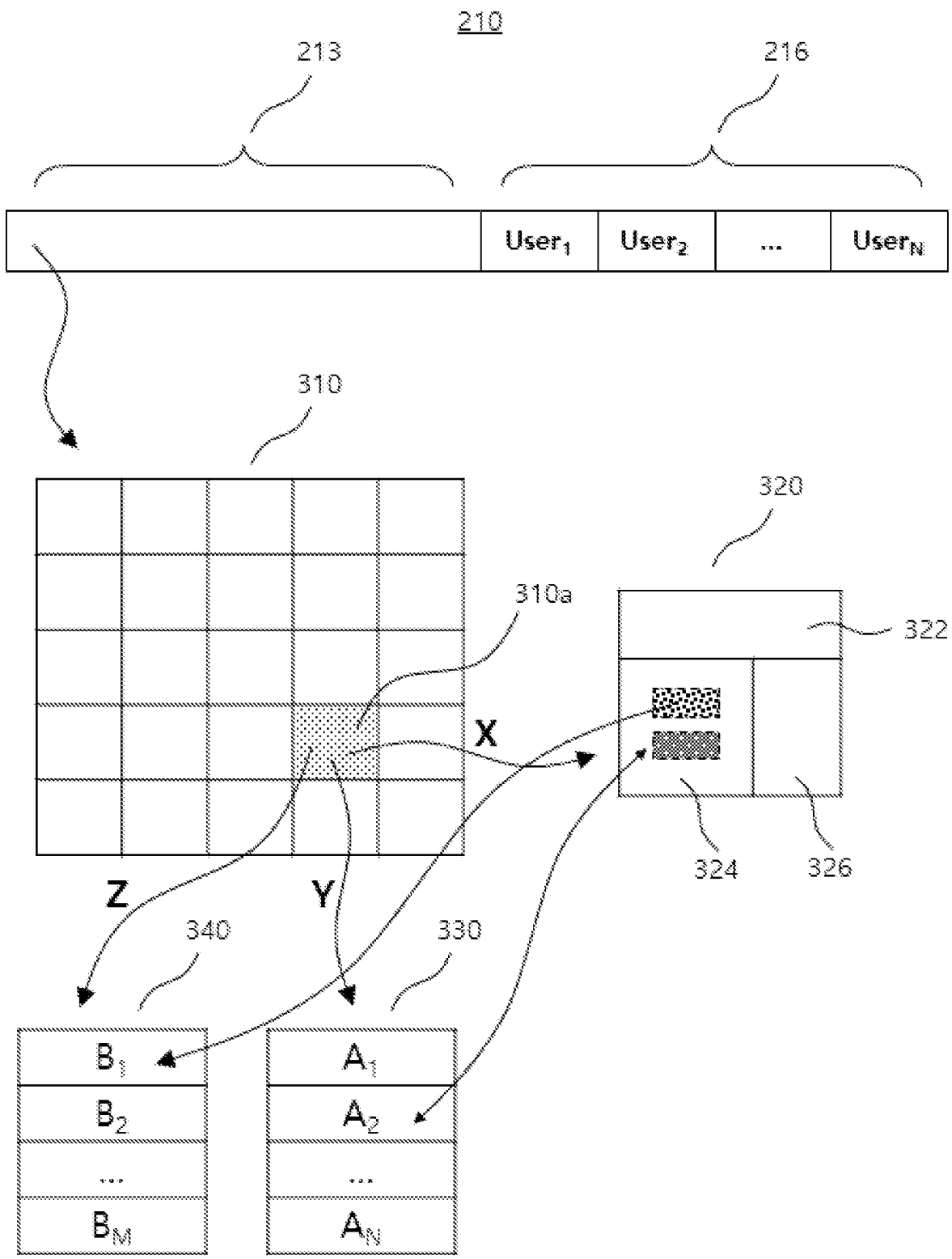
FIG. 3 is a block diagram illustrating the memory configuration of a strategy map memory unit shown in FIG. 2.

FIG. 3 is a block diagram illustrating the memory configuration of the strategy map memory unit shown in FIG. 2.

Referring to FIG. 3, the strategy map memory unit 210 includes the business strategy map region 213 and the user region 216.

The business strategy map region 213 corresponds to a memory region for a business strategy map (refer to 500). The business strategy map region 213 may include the one or more business specifications 310. Each of the business specifications 310 may define a relation between a business project and a business executant.

Each of the business specifications 310 may include a business contents region 320 and a business object link region 330. In an embodiment, each of the business specifications 310 may have a plurality of data arrays. For example, a specific business specification 310a may include the business contents region 320 in a first data array ("X" in FIG. 3) and the business object link region 330 in a second data array ("Y" in FIG. 3'). In an embodiment, a specific business specification 310a may include a plurality of the business contents regions 320 (e.g., $X_1, X_2, \ldots, X_P$) and a plurality of the business object link regions 330 (e.g., $Y_1, Y_2, \ldots, Y_Q$).

The business contents region 320 corresponds to a memory region for business contents 322. The business contents 322 may be accessed through the business specification 310 and may be written by a business executant.

The business contents region 320 may include a business chat message region 324 and a business chat room participant region 326. The business chat message region 324 corresponds to a memory region for at least one business chat message. In an embodiment, a specific business contents region 320 may include a plurality of the business chat message regions 324. Specific business contents 322 may be associated with a plurality of the business chat message regions 324 included in a corresponding business contents region 320. For example, a specific business log corresponding to specific business contents 322 may be associated with a plurality of business chat rooms. A user may open a plurality of business chat rooms associated with a corresponding business log through a specific business log. In an embodiment, a business chat message may be accessed through business contents 322 and may be written by a specific organization member including a business executant who has written the corresponding business contents 322.

The business chat room participant region 326 includes a list of at least one organization member who generates a business chat message of a business chat message region 324 included in a corresponding business contents region 320. In an embodiment, the business chat room participant region 326 may include information about at least one organization member who participates in a business chat room associated with a corresponding business chat message region 324 and who has been invited to the business chat room.

The business object link region 330 corresponds to a memory region for business object links $A_1, A_2, \ldots, A_N$. Each of the business object links $A_1, A_2, \ldots, A_N$ is a business chat message and may be used to access at least one business object. In an embodiment, a business object may be included in the business contents 322. At least one business object may define a business object provider and a business object recipient. In an embodiment, each of a specific business executant who has written a specific business log corresponding to specific business contents 322 and a specific business object provider (e.g., a business instructor) defined in a business object associated with a corresponding business log may belong to a specific business execution organization, and such business execution organizations may be the same or different.

Each of the one or more business specifications 310 may further include a business object region 340. For example, a specific business specification 310a may include a business contents region 320 in the first data array ("X" in FIG. 3), may include a business object link region 330 in the second data array ("Y" in FIG. 3), and may include a business object region in a third data array ("Z" in FIG. 3).

The business object region 340 corresponds to a memory region for business objects $B_1, B_2, \ldots, B_M$. In an embodiment, each of the business objects $B_1, B_2, \ldots, B_M$ may include a business message and business deadline written by a business provider and a business state indicative of the business processing stage of a business recipient in addition to the business provider and the business recipient.

The user region 216 may include a user profile. In this case, the user profile may include information about one or more users who have a right to a query or access request for specific information stored in the business strategy map region 213 through the at least one business strategy map user terminal 120. In an embodiment, the user profile may include a business contents sharing history.

In an embodiment, when the apparatus 110 for managing a business strategy map is connected to the at least one business strategy map user terminal 120 over a network, it may confirm information about a user who has accessed thereto through the corresponding business strategy map user terminal 120, may check the profile of the user stored in the user region 216 associated with the corresponding user information, and may provide associated information.

Figure 4:
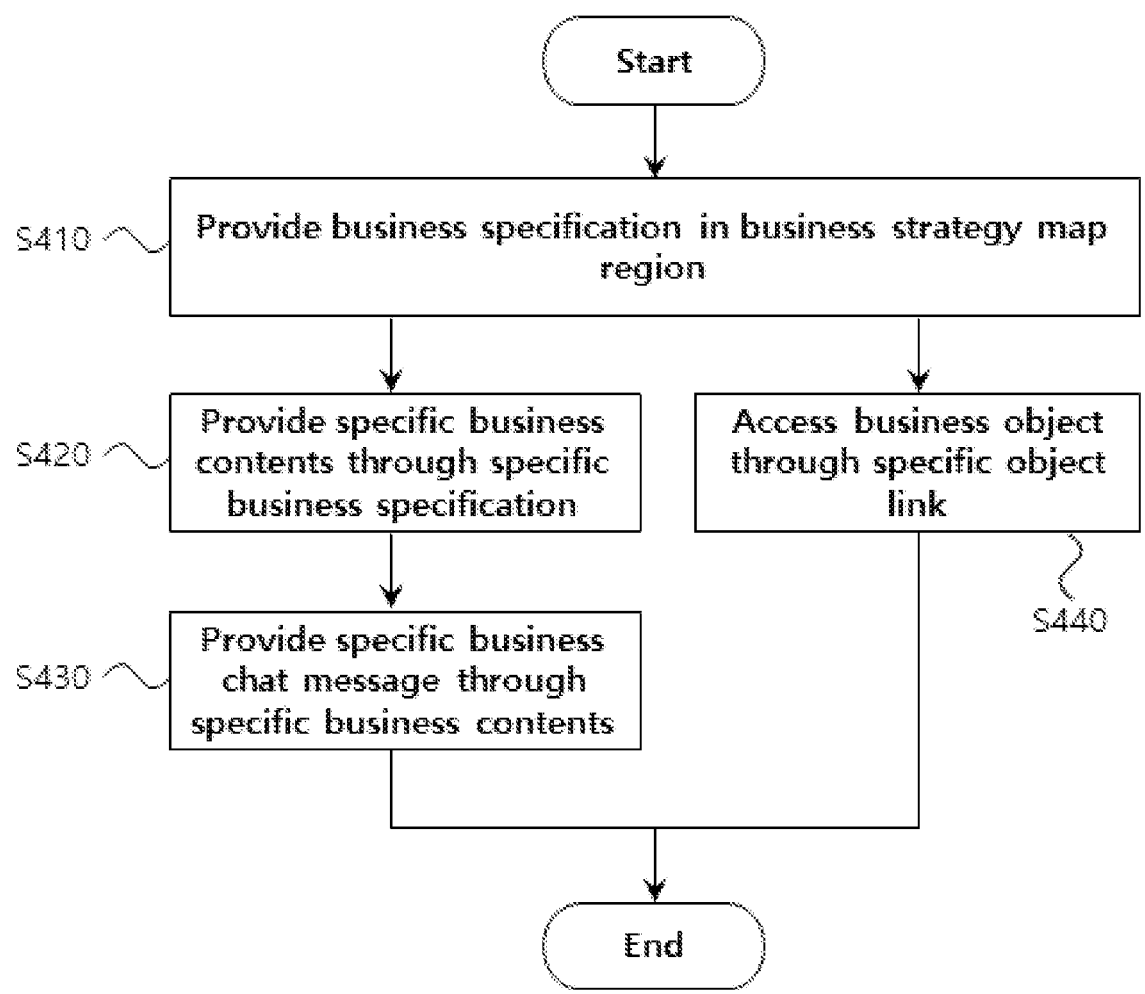
FIG. 4 is a flowchart illustrating a business strategy map management procedure performed by the apparatus for managing a business strategy map shown in FIG. 1.

FIG. 4 is a flowchart illustrating a business strategy map management procedure performed by the apparatus for managing a business strategy map shown in FIG. 1.

The business strategy map execution unit 222 may provide the business strategy map user terminal 120 with specific information based on the business specification 310 stored in the business strategy map region 213 at step S410. In an embodiment, the business strategy map execution unit 222 may provide the business strategy map user terminal 120 with the business strategy map 500 based on the business specification 310. Such contents are described with reference to FIG. 5.

Figure 5:
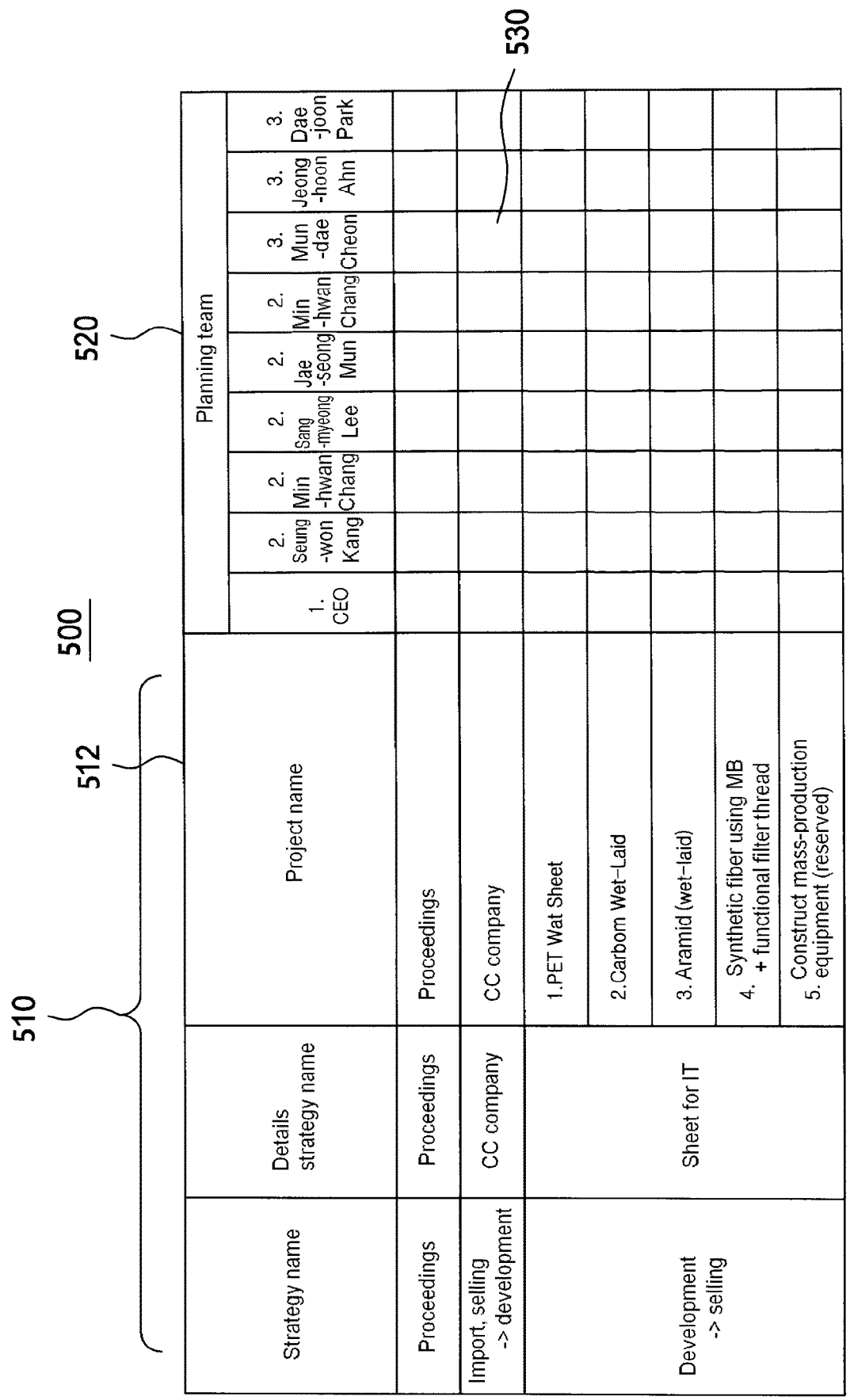
FIG. 5 is a diagram showing the state in which the apparatus for managing a business strategy map shown in FIG. 1 displays a business strategy map.

FIG. 5 is a diagram showing the state in which the business strategy map execution unit 222 of FIG. 2 displays the business strategy map 500 based on the business specification 310.

The business strategy map execution unit 222 may provide the business strategy map 500 including the business specification 310 in which a relation between a business project and a business executant has been defined from the business strategy map region 213. When the information is received from the business strategy map execution unit 222, the business strategy map user terminal 120 may display the business strategy map 500 based on the received information. More specifically, the business strategy map 500 may deploy business strategy cells 510 a vertical axis "a", may deploy business organization cells 520 in an abscissa axis "b", and may deploy a link cell 530 at each crossing point.

The business strategy map execution unit 222 may provide specific business contents 322 included in a specific business contents region 320 through a specific business specification 310a at step S420.

In an embodiment, the business strategy map execution unit 222 may allow the business strategy map user terminal 120 to display a business log (refer to FIG. 6) based on information about business contents 322 that are stored in a business contents region 320 and associated with a corresponding business strategy and a corresponding business organization through a link cell 530 in response to a request from the business strategy map user terminal 120.

The business strategy map execution unit 222 may provide a business chat message that is included in a business chat room and associated with specific business contents 322 at step S430. In an embodiment, the business strategy map execution unit 222 may open a business chat room through business contents 322 in response to a request from the business strategy map user terminal 120, may access the corresponding business chat room, and may store at least one business chat message generated through the corresponding business chat room in the business chat message region 324. For example, the business strategy map execution unit 222 may open a business chat room through a business log (refer to FIG. 6) displayed based on business contents 322, and may allow the business chat room to be accessed through the corresponding business log (e.g., through a business chat room connection hyperlink included in the corresponding business log).

Figure 7:
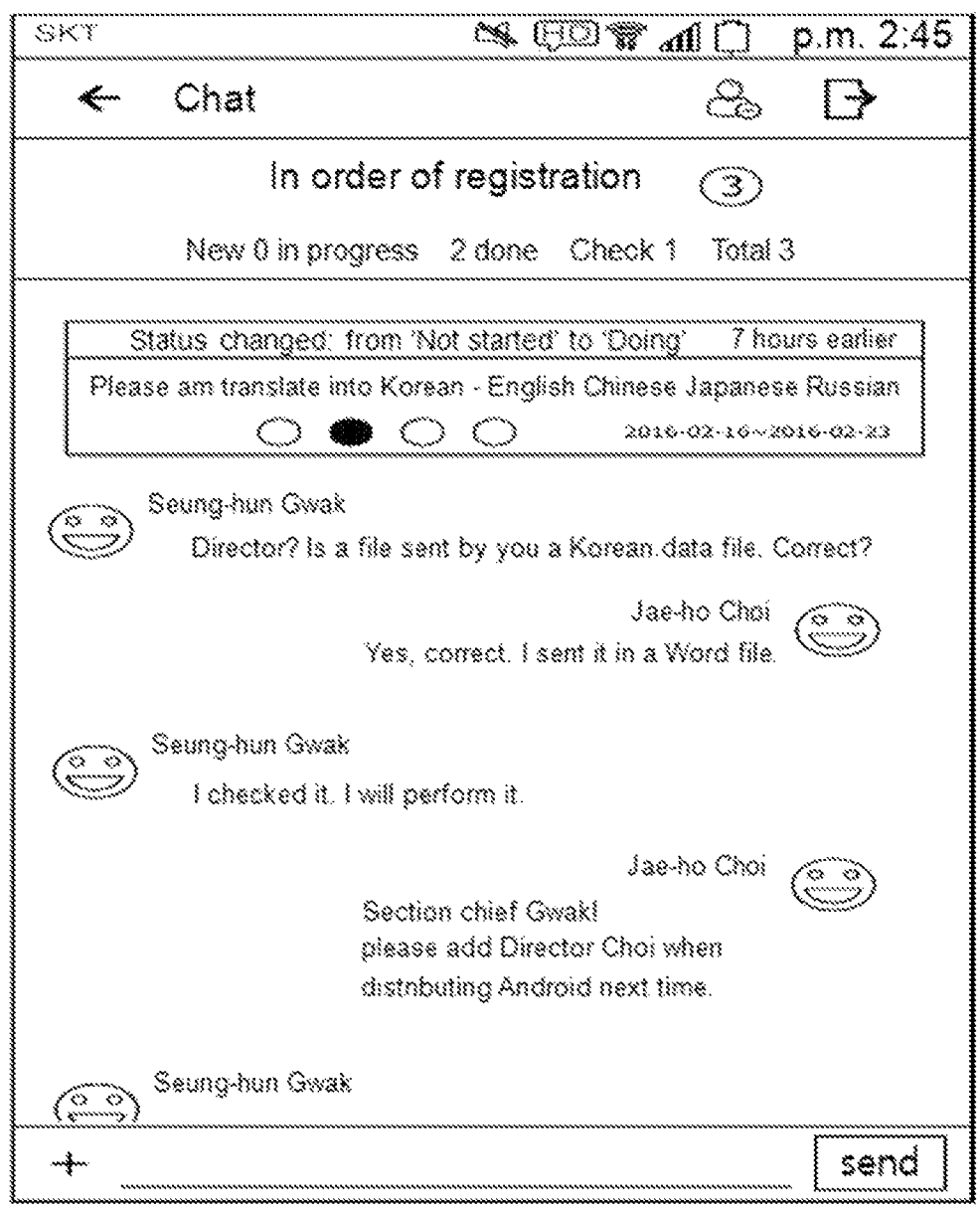
FIG. 7 is a diagram showing the state in which the apparatus for managing a business strategy map shown in FIG. 1 displays a business chat room.

In an embodiment, the business chat room may include business chat room information and a business chat message. The business chat room information may include business object summary information and participant information, and the business chat message may include a common message and business object links $A_1, A_2, \ldots, A_N$. For example, the business strategy map execution unit 222 may display the business chat room through the business log (refer to FIG. 6), displayed based on the business contents 322, in response to a request from the business strategy map user terminal 120 as shown in FIG. 7.

The business strategy map execution unit 222 may provide a specific business object through a specific business object link of a specific business object link region 330 at step S440. In an embodiment, the business strategy map execution unit 222 may provide the business strategy map user terminal 120 with pieces of information about a corresponding business object connected to a corresponding business object link through a specific business chat message that is generated from a business chat room and corresponds to a business object link (e.g., $A_2$) of the business object link region 330 associated with the corresponding business chat room. The business object is described in more detail later.

The apparatus 110 for managing a business strategy map may further perform the following business strategy map management procedure.

The business strategy map execution unit 222 may identify a business object link in at least one business chat message in the process of providing the business chat message, and may additionally provide a business message within a corresponding business object. In this case, the business chat message may correspond to a common message or business object link. More specifically, at least one business chat message associated with a specific business chat room and stored in a specific business chat message region 324 may correspond to a common message which may be exchanged in the business chat room (refer to FIG. 7) or may correspond to a business object link including specific business object information (e.g., work-to-do message information that includes a specific closing schedule and is assigned to a specific business recipient by a specific business provider in the form of a message). If a business object link included in a specific business object link region 330 is identified in at least one business chat message, the business strategy map execution unit 222 may additionally provide the business chat room with a business-related message included in a corresponding business object associated with the corresponding business object link. In this case, the business object link may link the business object included in the business object region 340.

In an embodiment, the business object may include at least one of a business message (e.g., a work-to-do message), a business provider (e.g., a work-to-do generator), a business recipient (e.g., a work-to-do recipient), a business state, a business deadline (e.g., a closing schedule), and a business evaluation.

In the embodiment, the business strategy map execution unit 222 may receive a request to delete a corresponding business object from the terminal of a business provider, and may change the corresponding business object into a corresponding business chat message based on a corresponding business message. For example, when a request to delete a specific business object is received, the business strategy map execution unit 222 may change a business chat message that is associated with the corresponding business object and corresponds to a business object link into a common message while deleting the corresponding business object, and may provide the corresponding business chat room with a notification message for such a change.

In an embodiment, the business strategy map execution unit 222 may receive a business recipient in response to a request from the user terminal, and may set a specific business chat message as a corresponding business object. For example, the business strategy map execution unit 222 may receive information, such as a specific business recipient and a specific closing schedule, and may set a business chat message associated with the corresponding information as a corresponding business object.

In the embodiment, the business strategy map execution unit 222 may generate a corresponding business object in which a corresponding business message has been set as a specific business chat message in the business object region 340 of the strategy map memory unit 210. For example, when information, such as a specific business recipient and a specific closing schedule, is received, the business strategy map execution unit 222 may set a business chat message associated with the corresponding information as a corresponding business object, and may generate the corresponding business object in the business object region 340. In this case, the business strategy map execution unit 222 may set a received specific business recipient and a received specific closing schedule as the corresponding business object along with the business chat message.

In the embodiment, the business strategy map execution unit 222 may generate a corresponding business object link for accessing a corresponding business object through the business specification 310 or the specific business chat message. In this case, the business object link corresponds to the address of a business object included in the business object region 340.

The business strategy map execution unit 222 may receive a business message and a business deadline in addition to a business recipient from a user terminal, and may generate a corresponding business object in a business object region 340 of the strategy map memory unit 210. In this case, the user terminal corresponds to the business strategy map user terminal 120. More specifically, the business strategy map execution unit 222 may directly receive the business recipient, the business message, and the business deadline from the business strategy map user terminal 120, and may generate the business object in the business object region 340.

The business strategy map execution unit 222 may receive a business log which may include a specific problem relating to a given business, and may generate corresponding business contents 322 in a business contents region 320. In an embodiment, the business strategy map execution unit 222 may receive a new business log (refer to FIG. 6) which may include a specific problem relating to a given business through a link cell 530 of the business strategy map 500 in response to a request and input from the business strategy map user terminal 120, and may generate corresponding business contents 322 in a business contents region 320 associated with a corresponding business strategy and a corresponding business organization.

In the embodiment, the business strategy map execution unit 222 may provide a specific problem to the person in charge of a given business and may query whether or not to open a business chat room. More specifically, the business strategy map execution unit 222 may provide a corresponding problem, included in a new business log (refer to FIG. 6) which may include a specific problem relating to a given business, to the person in charge who is associated with the corresponding business, and may support the corresponding person in charge or an associated organization member so that he or she opens a business chat room related to the new business log. In another embodiment, the business strategy map execution unit 222 may support every one so that he or she can open a business chat room freely.

If a specific user receives an invitation request for the specific user in a business chat room and accepts the invitation request, the business strategy map execution unit 222 may provide the specific user with a business chat message performed within the past specific range of the business chat room. In an embodiment, the past specific range may be manually determined from the past start time determined by an invitation user. In another embodiment, the past specific range may be automatically determined from the past start time so that the number of business objects corresponding to a specific number is included. In yet another embodiment, the past specific range may be determined from the time when a corresponding business chat room is opened by a chat opening user.

If a business object is included in a business evaluation, the business strategy map execution unit 222 may detect that the business processing stage of a business state has been set as a completion stage, and may request a corresponding business provider from a business evaluation. In an embodiment, if a business chat message included in a specific business chat room (refer to FIG. 7) and stored in a business chat message region 324 is associated with a specific business object including a business evaluation, the business strategy map execution unit 222 may detect the current stage of a corresponding business state by searching for information about the corresponding business object, may detect whether the corresponding business state has been changed into a completion stage whenever the business processing stage of the corresponding business state is changed, and may send a notification message that requests a business evaluation to a corresponding business provider if, as a result of the detection, the corresponding business state is found to have been changed into the completion stage.

If a business log received from a specific user is shared by another user, the business strategy map execution unit 222 may increase importance of a business project associated with the corresponding business log by taking into consideration the business evaluation appointment marks of a business object.

The business strategy map execution unit 222 may provide a project execution calendar (refer to FIG. 8) in which project execution deadlines are represented in the form of a schedule of a calendar type based on the project execution deadlines of business objects stored in a business object region 340 in response to a request from the business strategy map user terminal 120.

The business strategy map execution unit 222 may provide a specific timeline (refer to FIG. 9) in which corresponding schedules are represented in the form of a schedule of a time-series type based on the project execution start time schedule and closing schedule of a business object stored in the business object region 340 in response to a request from the business strategy map user terminal 120.

The disclosed technology may have the following effects. However, it is not meant that a specific embodiment should include all of the following effects or include only the following effects, and thus the scope of the disclosed technology should not be construed as being restricted by the description.

The apparatus for managing a business strategy map for providing internal customer satisfaction according to an embodiment of the present invention can efficiently manage and evaluate a business project performed by a business execution organization.

The apparatus for managing a business strategy map for providing internal customer satisfaction according to an embodiment of the present invention can support efficient information processing so that the processing is performed in relation to a business project based on a business specification.

While the invention has been shown and described with respect to the preferred embodiments, it will be understood by those skilled in the art that various changes and modifications may be made without departing from the spirit and scope of the invention as defined in the following claims.

What is claimed is:

1. An apparatus for managing a business strategy map for providing internal customer satisfaction, the apparatus comprising:
 a strategy map memory unit configured to comprise a business chat message region for at least one business chat message, a business object link region for a business object link included in the business chat message that is included in a business chat room and used to access a business object which includes a business message and in which a business provider and a business recipient have been defined, and a business object region for the business object comprising a business message and a business deadline written by the business provider and a business state indicative of a business processing stage of the business recipient;
 a business processor configured to:
  provide a specific business object through a specific business chat message that is generated from the business chat room and corresponds to the business object link within the business object link region associated with a corresponding business chat room;
  receive the business recipient through a request from a user terminal and set the specific business chat message as the business object;
  provide the business chat message within the business chat room;

identify, in a process of providing the business chat message, whether the business object link is included in the business chat message or whether the business chat message is a common message; and provide, based on the identification of the business object link being included in the business chat message, the business chat room with the business message included within the business object accessed by the business object link, wherein the strategy map memory unit is implemented via at least one processor.

2. The apparatus of claim 1, wherein, when a request to delete the specific business object is received, the business processor is further configured to delete the business object accessed by the business object link, and change the business chat message including the business object link used to access the business object into the common message.

3. The apparatus of claim 1, wherein, when a specific business recipient or a specific closing schedule is received, the business processor is further configured to set the business chat message associated with corresponding information as a corresponding business object, and generate a corresponding business object in the business object region.

4. The apparatus of claim 1, wherein, when a specific user receives an invitation request for the specific user in the business chat room and accepts the invitation request, the business processor is further configured to provide the specific user with the business chat message performed within a past specific range of the business chat room.

5. The apparatus of claim 1, wherein, when the business chat message included in a specific business chat room and stored in the business chat message region is associated with the specific business object including a business evaluation, the business processor is further configured to detect a stage of a corresponding business state by searching for information about a corresponding business object, detect whether the corresponding business state has been changed into a completion stage whenever the business processing stage of the corresponding business state is changed, and send a notification message that requests the business evaluation to a corresponding business provider if the corresponding business state is found to have been changed into the completion stage.

6. The apparatus of claim 1, wherein the business processor is further configured to provide a project execution calendar in which corresponding deadlines are represented in a form of a schedule of a calendar type based on a project execution deadline of the business object stored in the business object region in response to a request from the user terminal.

7. The apparatus of claim 1, wherein the business processor is further configured to provide a specific timeline in which corresponding schedules are represented in a form of a schedule of a time-series type based on a project execution start time schedule and a closing schedule of the business object stored in the business object region in response to a request from the user terminal.

8. A method for managing a business strategy map which is performed by an apparatus for managing a business strategy map, comprising a business processor and a strategy map memory unit comprising a business chat message region and a business object link region, the method comprising:

providing at least one business chat message through the business chat message region;

providing a business object link included in the business chat message that is included in a business chat room and used to access a business object which includes a business message and in which a business provider and a business recipient have been defined from the business object link region, and comprising a business message and a business deadline written by the business provider and a business state indicative of a business processing stage of the business recipient;

providing a specific business object through a specific business chat message that is generated from the business chat room and corresponds to the business object link within the business object link region associated with a corresponding business chat room;

receiving the business recipient through a request from a user terminal and setting the specific business chat message as the business object;

providing the business chat message within the business chat room;

identifying, in a process of providing the business chat message, whether the business object link is included in the business chat message or whether the business chat message is a common message; and providing, based on the identification of the business object link being included in the business chat message, the business chat room with the business message included within the business object accessed by the business object link.

9. A non-transitory computer-readable medium having embodied thereon a program, which when executed by a computer causes the computer to execute a method for managing a business strategy map which is performed by an apparatus for managing a business strategy map, comprising a business processor and a strategy map memory unit comprising a business chat message region and a business object link region, the method comprising:

providing at least one business chat message through the business chat message region;

providing a business object link included in the business chat message that is included in a business chat room and used to access a business object which includes a business message and in which a business provider and a business recipient have been defined from the business object link region, and comprising a business message and a business deadline written by the business provider and a business state indicative of a business processing stage of the business recipient;

providing a specific business object through a specific business chat message that is generated from the business chat room and corresponds to the business object link within the business object link region associated with a corresponding business chat room;

receiving the business recipient through a request from a user terminal and setting the specific business chat message as the business object;

providing the business chat message within the business chat room;

identifying, in a process of providing the business chat message, whether the business object link is included in the business chat message or whether the business chat message is a common message; and providing, based on the identification of the business object link being included in the business chat message, the business chat room with the business message included within the business object accessed by the business object link.

\* \* \* \* \*